(12) United States Patent
Staschko et al.

(10) Patent No.: US 6,537,683 B1
(45) Date of Patent: Mar. 25, 2003

(54) STRATIFIED COMPOSITE MATERIAL FOR SLIDING ELEMENTS AND METHOD FOR THE PRODUCTION THEREOF

(75) Inventors: Klaus Staschko, Taunusstein-Stetzenhahn (DE); Karl-Heinz Gruenthaler, Usingen (DE)

(73) Assignee: Federal-Mogul Wiesbaden GmbH & Co. KG (DE)

(*) Notice: Subject to any disclaimer, the term of this patent is extended or adjusted under 35 U.S.C. 154(b) by 0 days.

(21) Appl. No.: 09/831,009

(22) PCT Filed: Nov. 10, 1999

(86) PCT No.: PCT/DE99/03607

§ 371 (c)(1), (2), (4) Date: May 3, 2001

(87) PCT Pub. No.: WO00/29647

PCT Pub. Date: May 25, 2000

(30) Foreign Application Priority Data

Nov. 13, 1998 (DE) .......................................... 198 52 481

(51) Int. Cl.[7] .............................. B32B 7/00; B32B 7/02; B32B 15/01; C25D 3/02; C25D 5/18

(52) U.S. Cl. ....................... 428/610; 428/646; 428/668; 428/671; 384/912; 384/913; 205/122; 205/238; 205/239; 205/252

(58) Field of Search .............................. 205/122, 238, 205/239, 252; 384/912, 913; 428/610, 696, 668, 671

(56) References Cited

U.S. PATENT DOCUMENTS

| | | | |
|---|---|---|---|
| 5,156,729 A | * 10/1992 | Mahrus et al. ............... | 205/104 |
| 5,300,368 A | * 4/1994 | Kubert et al. ................ | 205/104 |
| 5,525,203 A | 6/1996 | Rumpf et al. | |
| 5,666,644 A | 9/1997 | Tanaka et al. | |
| 5,925,471 A | * 7/1999 | Eastham et al. ............. | 148/518 |
| 5,976,712 A | * 11/1999 | Staschko et al. ............. | 384/912 |
| 6,077,815 A | * 6/2000 | Grunthaler et al. ......... | 428/614 |
| 6,139,191 A | * 10/2000 | Andler et al. ................ | 156/150 |
| 6,194,087 B1 | * 2/2001 | Huhn et al. .................. | 384/276 |
| 6,234,678 B1 | * 5/2001 | Tsuji et al. ................... | 384/912 |
| 6,267,508 B1 | * 7/2001 | Bank et al. ................... | 384/273 |
| 6,301,784 B1 | * 10/2001 | Niegel et al. ............. | 29/898.12 |
| 6,312,579 B1 | * 11/2001 | Bank et al. ................... | 205/102 |

FOREIGN PATENT DOCUMENTS

| | | |
|---|---|---|
| DE | 830269 | 7/1949 |
| DE | 4103117 | 2/1991 |

* cited by examiner

Primary Examiner—John J. Zimmerman
Assistant Examiner—Jason Salvage
(74) Attorney, Agent, or Firm—Reising, Ethington, Barnes, Kisselle, Learman & McCulloch, P.C.

(57) ABSTRACT

A method is described for producing composite multilayer materials which exhibit optimum properties throughout their entire service life. The composite multilayer material comprises a backing layer, a bearing metal layer, an intermediate layer and an electrodeposited overlay, which exhibits a hardness which increases continuously from its surface in the direction of the bearing metal layer. The method provides for the electrodeposition as overlay of a lead-free alloy with at least one hard and one soft component, the current density being modified within the range of from 0.3 to 20 $A/dm^2$ during the deposition process and/or the temperature of the electroplating bath being modified within the range of from 15° C. to 80° C.

17 Claims, No Drawings

STRATIFIED COMPOSITE MATERIAL FOR SLIDING ELEMENTS AND METHOD FOR THE PRODUCTION THEREOF

DESCRIPTION

The invention relates to a method for the production of a composite multilayer material for sliding elements, in which a bearing metal layer and an intermediate layer are applied to a backing layer and an overlay is electrodeposited on the intermediate layer. The invention also relates to a corresponding composite multilayer material for sliding elements.

Known composite multilayer materials consist of a stable backing layer, generally of steel, with a cast-on, sintered-on or rolled-on bearing metal layer, which is generally copper- or aluminium-based, and an overlay deposited thereon, e.g. a lead-tin-copper alloy. In general, a diffusion barrier layer, e.g. of nickel, is arranged between the overlay and the bearing metal. Such composite multilayer materials are known from DE-PS 830 269, for example.

The overlay assumes a plurality of functions. It may render hard, abrasive particles harmless by embedding and it serves in conformation to the shaft during the running-in phase. It provides a degree of corrosion protection for the bearing metal and exhibits emergency running properties in the case of an oil shortage.

The life cycle of the overlay comprises the following phases:

running-in phase with a relatively high level of wear continuous running phase with constant relatively low rate of wear phase after layer has been totally worn away, with increased scuffing sensitivity.

The hardness of conventional overlays represents a compromise between embeddability and emergency running behaviour, i.e. low layer hardness, and wear resistance, i.e. high layer hardness.

To optimise overlay performance, for example, a special structure has been developed which is built up from alternate layers of a softer material and a harder material. Such an overlay is known from DE 39 36 498 A1, for example. An electric current is established in the electroplating bath with a density of 0–80 A/dm$^2$ and a potential of –1.5 to +0.5 volts. Alternate layers of CuSnPb (soft layer) and Cu or CuSn (hard layer) are deposited from a lead-tin-copper bath. Deposition is achieved from a single fluoroborate-containing bath by changing the deposition parameters.

This layer arrangement, which may comprise up to several hundred layers, the individual layers each having a thickness of only a few $\mu$m, has the serious disadvantage that copper and tin interdiffuse, creating brittle intermetallic phases which exhibit unfavourable tribological properties and additionally have a tendency towards brittle fracture.

A homogenisation-based method is known from DE 41 03 117 C2 for producing sliding elements having an overlay of a ternary or binary white metal alloy. This method has the disadvantage, however, that the concentration of soft component or hard component cannot be varied as desired over the layer thickness, since the law of diffusion ensures that a concentration distribution is always established in accordance with an e-function. In the case in particular of a steeply falling e-function, absolutely no more variation in hardness is obtained in the lower overlay region. A further disadvantage is that an additional method step is necessary to adjust the concentration gradient after electrodeposition of the overlay.

The object of the invention is to provide a method with which it is possible to produce a composite multilayer material which exhibits optimum properties during its entire service life.

The invention is based on the finding that optimum properties are obtained in particular when the overlay exhibits optimum hardness throughout the service life of the sliding element made from the composite multilayer material. This is achieved in that, in the case of the composite multilayer material according to the invention, the overlay exhibits a hardness which increases continuously from its surface in the direction of the bearing metal layer.

The overlay, and thus the composite multilayer material according to the invention, exhibit a layer hardness conformed to the respective operating phase: low hardness during the running-in phase, increasing hardness during the continuous running phase, such that the service life may thus be considerably increased overall. It has proved possible to improve service life by a factor of 1.5 to 2 in comparison with conventional overlays.

Such an overlay requires a method by means of which hardness may be specifically adjusted over the layer thickness.

The object is achieved according to the method in that a lead-free alloy with at least one hard and one soft component is deposited as overlay, the current density being modified within the range of from 0.3–20 A/dm$^2$ during the deposition process and/or the temperature of the electroplating bath being modified within the range of from 15° C. to 80° C.

The method according to the invention permits of several alternatives.

According to a first variant, the method is performed at a constant temperature and the current density is modified, preferably increased, during the deposition process. The result of this is that, as the current density increases, the soft component is preferentially deposited, which leads to a larger proportion of soft component in the overlay.

According to a second variant of the method, the current density is set at a certain value and the temperature is modified. It has been shown that there is a correlation between temperature and deposition behaviour of the hard and soft components to the effect that, as the temperature increases, deposition of the hard component is favoured. In order to establish the desired hardness gradient, it is necessary, according to a first embodiment of this second method variant, to bring the temperature down from a high value during deposition. This means that the electroplating bath has to be cooled.

Since, from the point of view of plant, it is simpler to heat up the electroplating bath, a second embodiment of this second method variant involves the preferred addition of a polariser to the electroplating bath. It has emerged that an unsaturated carboxylic acid-based additive is suitable for this purpose. The polariser preferably contains approx. 30% carboxylic acid and up to a third aryl polyglycol ether and/or alkyl polyglycol ether, the rest consisting of water. This additive is preferably added in amounts of up to 10% relative to the total amount of electroplating bath.

This "polariser" additive effects a modification of the potential of the harder component, with the result that deposition of the harder component is reduced as the temperature increases.

The method variants may also be combined with one another, both the current density and the temperature then being modified during the deposition process.

The method has the advantage of making it possible to produce the layer with the respective running properties by electrodeposition from a single bath. Use of a plurality of electroplating baths, e.g. of different temperatures, is not ruled out.

Current density and/or temperature may be modified in stages, such that a laminar structure is established within the electrodeposited overlay. However, it has been shown that sudden changes in hardness are not always advantageous from the point of view of running properties. A continuous variation in hardness, i.e. a hardness gradient, is therefore preferred. Accordingly, the current density and/or temperature Is preferably continuously modified.

The current density is preferably increased at a rate of from 0.1 to 0.5 A/(dm² min).

The temperature is preferably modified at a rate of from 1° to 5° C./min.

The current density range covered during deposition depends on the alloy used. If a binary alloy of tin and copper is deposited, the current density preferably varies within the range of from 0.5–10 A/dm². Suitable binary alloys include in particular CuAg, AgCu, SnCu, CuSn, SnBi or SnAg.

Deposition is preferably performed using a fluoroborate-free electroplating bath.

The method according to the invention makes it possible to adjust the hardness of the overlay upwards in the range of from 10 HV to 150 HV.

The bath composition is such that alloys of high and low hardness may be deposited.

The proportion of hard component preferably increases from the overlay surface in the direction of the bearing metal layer from 1 wt. % to 20 wt. %. The overlay alloy may additionally contain 0.1 wt. % to 5 wt. % nickel and/or cobalt. This addition has the effect of stabilising diffusion in the binary systems.

An intermediate layer serves as diffusion barrier and coupling agent and to improve wear and fatigue resistance. It preferably consists of nickel, SnNi, Ni+SnNi (two layers), Co or Fe. The tin content of the SnNi alloy layer preferably amounts to 65 to 75%.

Deposition of the intermediate layer may likewise be performed using electroplating or electroless (autocatalytic) plating. The bearing metal layer may be sintered or cast.

EXAMPLE 1

SnCu Overlay

Electrodeposited layers were produced on a lead-bronze substrate with a nickel intermediate layer.

In the tin zone, the composition could be adjusted to copper contents of from 1 to 20%. The copper content increased continuously from the layer surface towards the bearing metal. The hardness profile matched this Cu concentration profile, increasing from 10 HV (at overlay surface) up to 80 HV (in the vicinity of the bearing metal).

The layer was deposited from a methanesulfonic acid bath containing tin and copper methanesulfonate and additives comprising organic wetting and smoothing agents. The layer thickness of the overlay could be adjusted in a range of between 8 and 50 µm.

The copper concentration profile was produced by deposition at current densities of from 3 to 5 A/dm² with additional modification of the bath temperature in the range of from 20° C. to 60° C.

EXAMPLE 2

SnAg Overlay

Deposition on CuSn bearing metal with intermediate layer of Ni.

The overlay was deposited from a methanesulfonic acid tin-silver bath with silver contents of from 1 to 20%.

The concentration gradient of the silver from the overlay surface to the bearing metal could be produced by modifying the current density from 0.3 to 10 A/dm². The hardness of the overlay was between 10 HV (tin-rich surface) and up to 150 HV (silver-rich phase).

What is claimed is:

1. A method of producing a composite multilayer material for sliding elements, in which a bearing metal layer and an intermediate layer are applied to a backing layer and an overlay is electrodeposited on the intermediate layer, wherein a lead-free alloy with at least one hard and one soft component is deposited as overlay, the current density being modified within the range of from 0.3–20 A/dm² during the deposition process and/or the temperature of the electroplating bath being modified within the range of from 15° C. to 80° C.

2. A method according to claim 1, wherein the temperature is not modified and the current density is increased.

3. A method according to claim 1, wherein the current density is not modified and the temperature is reduced.

4. A method according to claim 1, wherein a polarizer is added to the electroplating bath; and the current density is not modified and the temperature is increased.

5. A method according to claim 4, wherein an unsaturated carboxylic acid-based polarizer is added.

6. A method according to claim 4 or claim 5, wherein the polarizer is added in an amount of up to 10%.

7. A method according to claim 1, wherein the current density and/or the temperature is/are modified continuously.

8. A method according to claim 1, wherein the current density is increased at a rate of from 0.1 to 0.5 A/(dm² min).

9. A method according to claim 1, wherein the temperatures are modified at a rate of from 1° C. to 5° C./min.

10. A method according to claim 1, wherein a binary alloy of tin and copper is deposited, the current density being increased in the range of from 0.5 to 10 A/dm².

11. A method according to claim 1, wherein a binary alloy of CuAg, AgCu, SnCu, CuSn, SnBi or SnAg is deposited.

12. A method according to claim 1, wherein a fluoroborate-free electroplating bath is used.

13. A composite multilayer material for sliding elements having a backing layer, a bearing metal layer, an intermediate layer and an overlay applied by electrodeposition, wherein the overlay exhibits a hardness which increases continuously from its surface in the direction of the bearing metal layer, and the intermediate layer consists of Co, Fe or Ni+SnNi wherein Ni+SnNi are separate layers and the alloy SnNi contains from 65 to 75% Sn.

14. A composite multilayer material for sliding elements having a backing layer, a bearing metal layer, an intermediate layer and an overlay applied by electrodeposition wherein the overlay exhibits a hardness which increases continuously from its surface in the direction of the bearing metal layer, and the overlay consists of a lead-free binary alloy with a soft and a hard component selected from the group consisting of CuAg, AgCu, CuSn, SnBi or SnAg.

15. A composite multilayer material for sliding elements having a backing layer, a bearing metal layer an intermediate layer and an overlay applied by electrodeposition, wherein the overlay, comprises a lead free composition exhibits a hardness which increases continuously from its surface in the direction of the bearing metal layer, and a hard component content of the overlay increases from the overlay surface in the direction of the bearing metal layer from 1 wt. % to 20 wt.

16. A composite multilayer material for sliding elements having a backing layer, a bearing metal layer, an intermediate layer and an overlay applied by electrodeposition, wherein the overlay exhibits a hardness which increases continuously from its surface in the direction of the bearing metal layer, and the overlay contains 0.1 wt. % to 5 wt. % nickel and/or cobalt.

17. A composite multilayer material according to any one of the claims 13 to 16 wherein the hardness increases in the range of from 10 HV to 150 HV.

* * * * *